United States Patent
Hidaka

(10) Patent No.: US 7,584,819 B2
(45) Date of Patent: Sep. 8, 2009

(54) VEHICLE STEERING SYSTEM

(75) Inventor: Kenichiro Hidaka, Chita-gun (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 91 days.

(21) Appl. No.: 11/699,324

(22) Filed: Jan. 30, 2007

(65) Prior Publication Data

US 2007/0193818 A1 Aug. 23, 2007

(30) Foreign Application Priority Data

Feb. 9, 2006 (JP) ............................ 2006-032910

(51) Int. Cl.
*B62D 5/06* (2006.01)
(52) U.S. Cl. .................................... 180/444
(58) Field of Classification Search ................ 180/443, 180/444, 446, 402, 421; 701/41
See application file for complete search history.

(56) References Cited

U.S. PATENT DOCUMENTS

| | | | | |
|---|---|---|---|---|
| 6,102,151 | A * | 8/2000 | Shimizu et al. | 180/446 |
| 6,705,424 | B2 | 3/2004 | Ogawa et al. | |
| 6,742,621 | B2 * | 6/2004 | Yanaka | 180/446 |
| 7,257,474 | B2 * | 8/2007 | Kato et al. | 701/41 |
| 7,406,374 | B2 * | 7/2008 | Ono et al. | 701/41 |
| 2005/0016791 | A1 * | 1/2005 | Fukushima et al. | 180/446 |

FOREIGN PATENT DOCUMENTS

| | | |
|---|---|---|
| DE | 101 52 704 A1 | 7/2003 |
| DE | 103 37 954 A1 | 3/2005 |
| DE | 10 2004 061 832 A1 | 7/2006 |
| EP | 1 621 448 | 2/2006 |
| JP | 2000-344120 | 12/2000 |
| JP | 2005-112024 | 4/2005 |

OTHER PUBLICATIONS

Office Action dated Jan. 15, 2008 in DE application No. 10 2007 004 369.6 with English translation.
Chinese Office Action dated Apr. 4, 2008 issued in counterpart Chinese Application No. 200710005107.5 with English translation.
Chinese Office Action dated Jan. 9, 2009 issued in corresponding Chinese Application No. 200710005107.5, with English translation.
French Search Report and Written Opinion dated Feb. 17, 2009 issued in corresponding French Application No. 07/00957, with English translation.

* cited by examiner

*Primary Examiner*—Tony H. Winner
(74) *Attorney, Agent, or Firm*—Nixon & Vanderhye PC

(57) ABSTRACT

A vehicle steering system for steering vehicle wheels includes a steering wheel, a steering power assisting unit for providing assisting power when the steering wheel is steered, a transfer ratio control mechanism for controlling the ratio of a steering angle of the steering wheel to a steered angle of the vehicle wheels according to a vehicle condition; a steering torque sensor, a motor control circuit for controlling the driving motor so as to cancel the steering torque applied to the steering wheel when the steering torque sensor detects a steering torque applied to the steering wheel until the transfer ratio control mechanism starts operation. The transfer ratio control mechanism includes a transfer ratio changing mechanism and a driving motor for driving the transfer ratio changing mechanism.

11 Claims, 4 Drawing Sheets

VEHICLE STEERING SYSTEM

CROSS REFERENCE TO RELATED APPLICATION

The present application is based on and claims priority from Japanese Patent Application 2006-32910, filed Feb. 9, 2006, the contents of which are incorporated herein by reference.

BACKGROUND OF THE INVENTION

1. Field of the Invention

The present invention relates to a vehicle steering system that includes a transfer ratio control mechanism and a steering power assisting mechanism.

2. Description of the Related Art

There is a vehicle steering system that includes a transfer ratio control mechanism for controlling the transfer ratio of the steering angle of the steering wheel to the steered angle of the steered wheels (i.e. front wheels) together with a steering power assisting mechanism for giving a driver an assisting steering power. The transfer ratio control mechanism is usually equipped with a gear mechanism and a gear driving motor.

However, if the steering wheel of a vehicle that is equipped with the above vehicle steering system is steered at a high steering speed when the vehicle runs at a low speed, the front wheels of the vehicle that are steered may turn at such a high speed that the steering power assisting mechanism can not follow the speed. As a result, the driver may have to add much more power than expected steering power to steer the steering wheel.

In order to solve this problem, JP-A-2000-344120 proposes a steering system in which the transfer ratio control mechanism increases the transfer ratio when the steering speed becomes higher than a preset speed. However, this steering system does not assist a driver very much to steer the vehicle when the vehicle runs at a low speed; and the driver may have to turn the steering wheel more than he desires.

SUMMARY OF THE INVENTION

An object of the invention is to provide an improved vehicle steering system that is free from the above problem.

It has been noted that an abrupt increase of steering torque that is necessary for a driver to apply to the steering wheel is caused firstly by slow response of the transfer ratio control mechanism and secondly by slow response of the steering power assisting mechanism, as shown in FIG. 4. The slow response of the steering power assisting mechanism is caused by a high steering speed at a low vehicle speed and also the slow response of the transfer ratio control mechanism.

When the steering torque applied to the steering wheel by a driver is applied to the shaft of the gear driving motor, as shown in FIG. 5A, the gear driving motor may run at idle when a driver starts steering the steering wheel at time ts until the transfer ratio control mechanism starts its operation at time te. As a result, the output angle (ACT angle) of the output shaft of the transfer ratio control mechanism may not timely respond to the steering angle, as shown by a dotted line in FIG. 5B.

According to a feature of the invention, a vehicle steering system includes a steering power assisting unit for providing assisting power when the steering wheel is steered, a transfer ratio control mechanism for controlling the ratio of a steering angle of the steering wheel to a steered angle of the vehicle wheels according to a vehicle condition, a steering torque sensor, a motor control circuit for controlling the driving motor so as to cancel the steering torque applied to the steering wheel when the steering torque sensor detects a steering torque applied to the steering wheel until the transfer ratio control mechanism starts operation.

The torque sensor may detect the torque applied to the steering wheel when the steering wheel is turned from a prescribed angular position or when the steering wheel is turned at the steering speed being zero. Preferably, the motor control circuit calculates a target angle for the driving motor to turn, and the torque sensor detects the torque applied to the steering wheel before the target angle is given to the driving motor.

The motor control circuit may continuously provide a torque to cancel the steering torque after the transfer ratio control mechanism has started. In this case, the direction of the torque to cancel the steering torque is changed when the direction of the steering torque changes.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A preferred embodiments according to the present invention will be described with reference to FIGS. 1-6.

Figure 1:
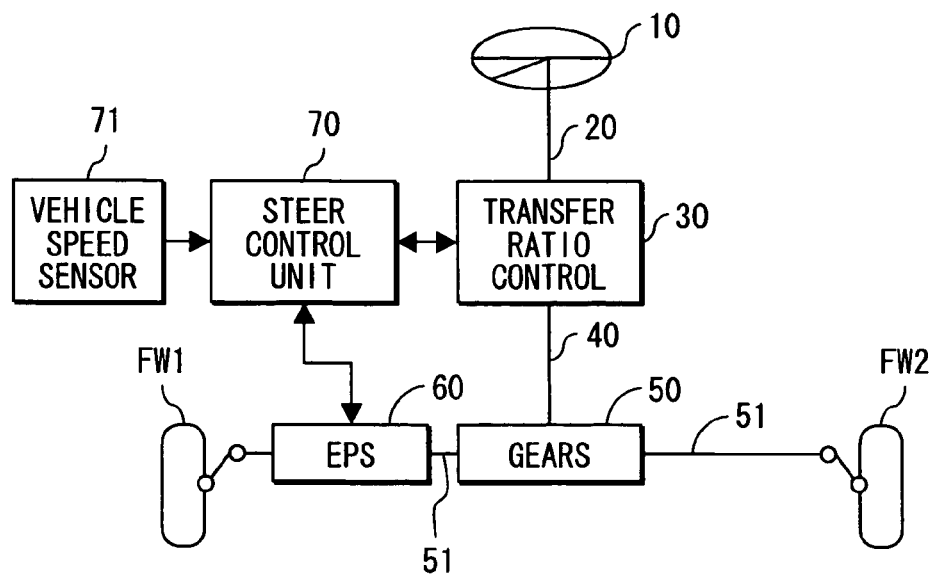
FIG. 1 is a block diagram of a vehicle steering system according to a preferred embodiment of the invention.

As shown in FIG. 1, the vehicle steering system according to the preferred embodiment includes a steering wheel 10, a transfer ratio control mechanism 30, a rack-and-pinion-gear mechanism 50, an electric power steering mechanism (EPS) 60, a steer control unit 70, a vehicle speed sensor 71, etc.

The transfer ratio control mechanism 30 has an input shaft 20 connected with the steering wheel 10 and an output shaft 40. The output shaft 40 is connected with a rack shaft 51 via the rack-and-pinion-gear mechanism 50. The rack shaft 51 is connected at its opposite ends with steered front wheels FW1, FW2. The EPS 60 is disposed coaxial with the rack shaft 51. The EPS 60 includes a motor (not shown) that provides a power for assisting steering operation of the steering wheel 10.

Figure 2:
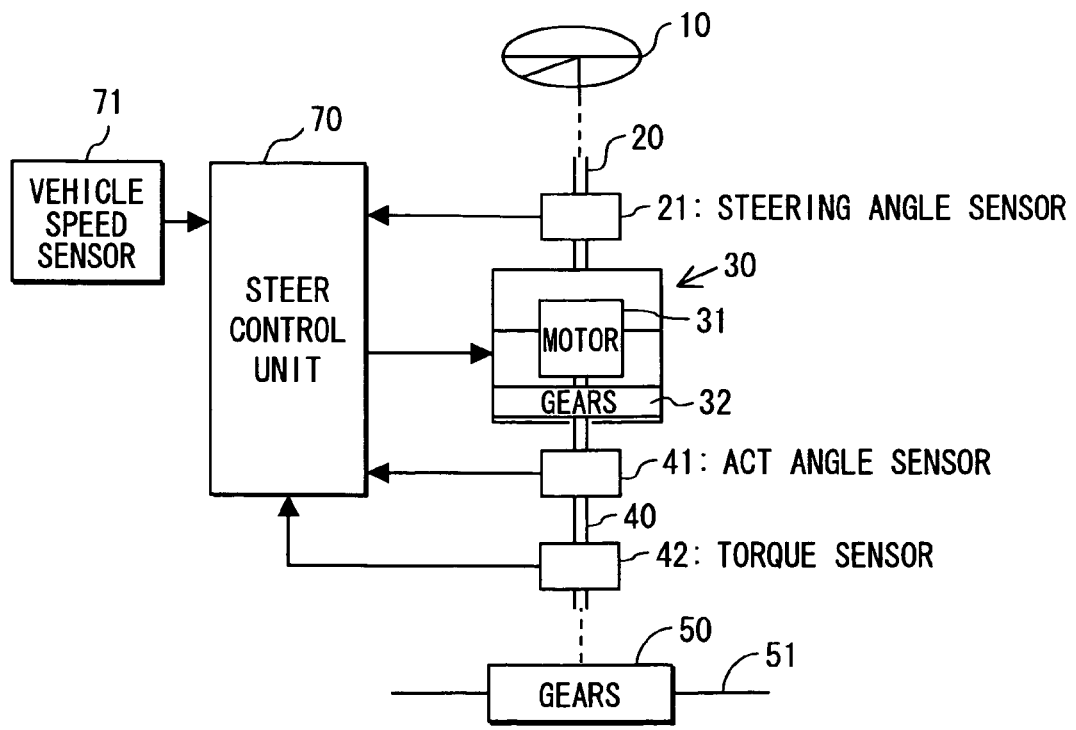
FIG. 2 is a block diagram showing a main portion of the vehicle steering system according to the preferred embodiment.

As shown in FIG. 2, the transfer ratio control mechanism 30 includes a gear mechanism that connects the input shaft 20 and the output shaft 40 and a motor 31 that drives this gear mechanism to change the transfer ratio of the steering angle of the steering wheel to the steered angle of the front wheels FW1, FW2.

The input shaft 20 is provided with an steering angle sensor 21, and the output shaft 40 is provided with an output angle (hereinafter referred to as the ACT angle) sensor 41 and a steering torque sensor 42. The ACT angle corresponds to the steered angle of the front wheels FW1, FW2.

The steering control unit 70 provides the motor 31 of the transfer ratio control mechanism 30 with a motor control signal based on the sensor signals of the steering angle sensor 21, the ACT angle sensor 41, the steering torque sensor 42 and the vehicle speed sensor 71.

The steering control unit 70 includes a target angle calculating section 70a, a feedback control section 70b and a torque duty calculation section 70c.

Figure 3:
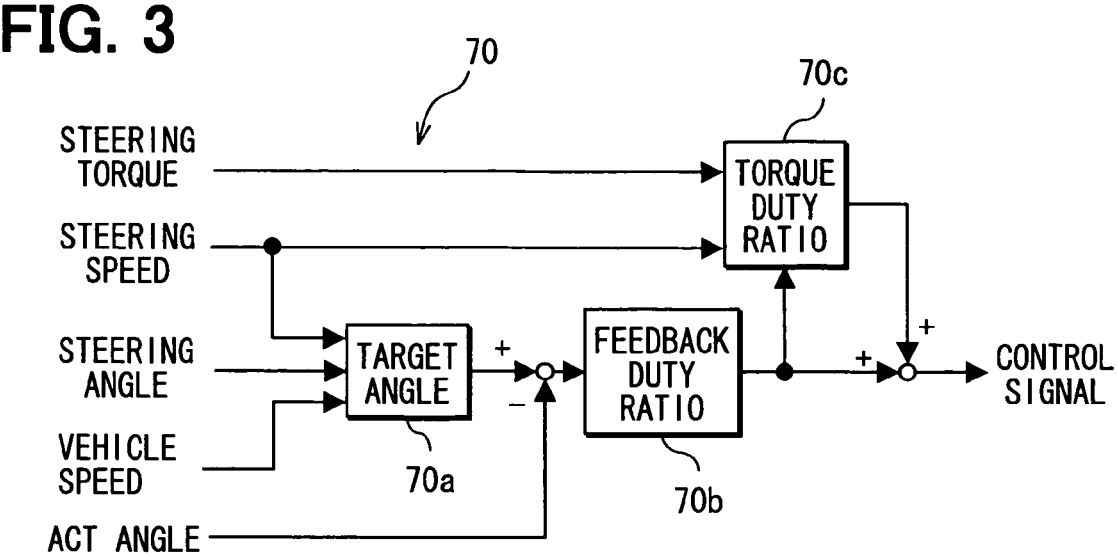
FIG. 3 is a block diagram showing a transfer ratio control mechanism.
Figure 4:
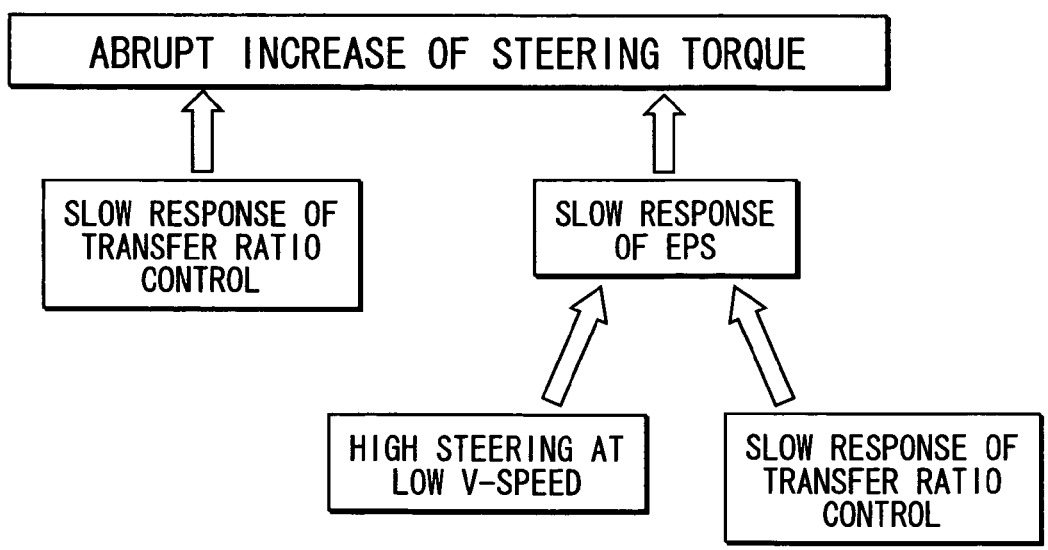
FIG. 4 is a root cause analysis diagram.
Figure 5A:
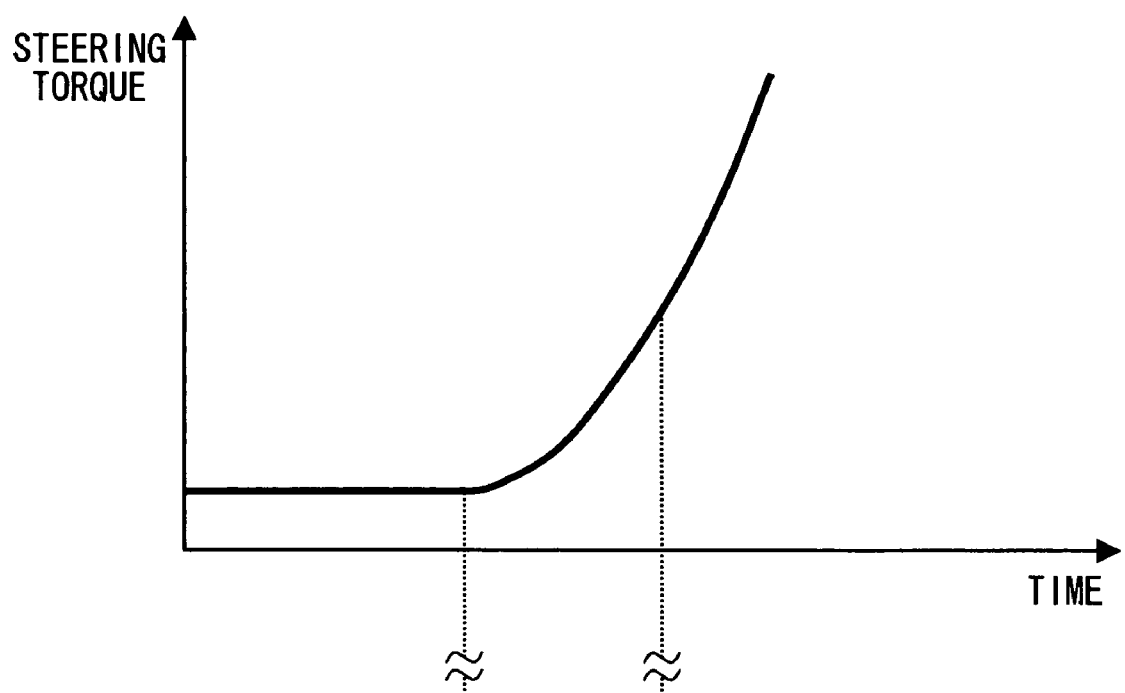
FIG. 5A is a graph showing a steering torque characteristic.
Figure 5B:
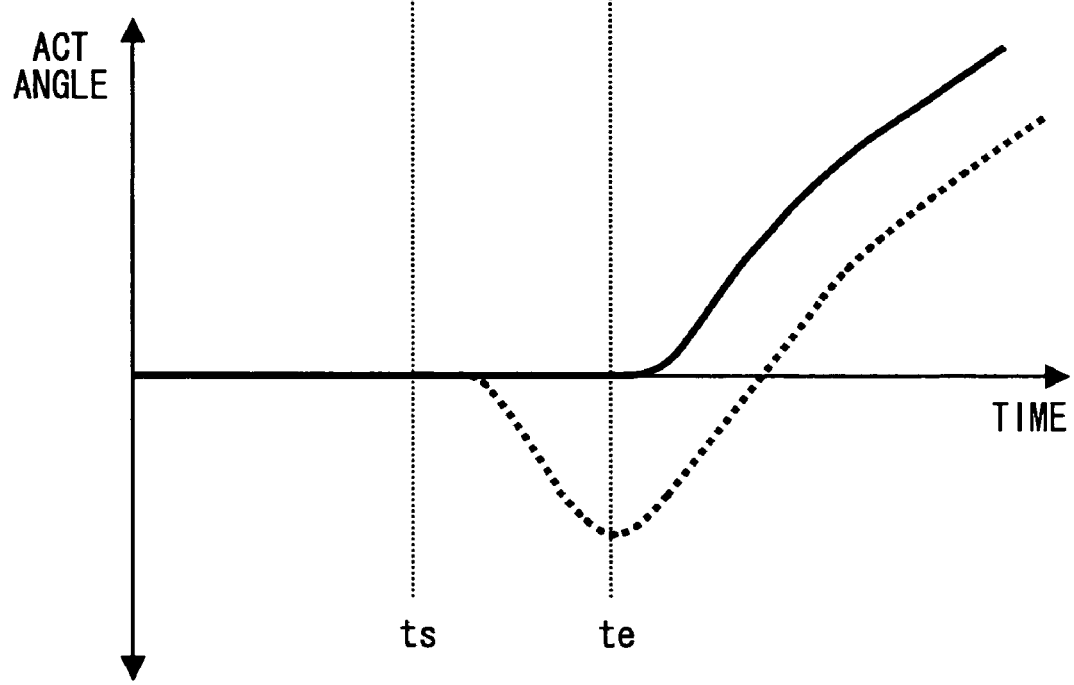
FIG. 5B is a graph showing an output angle characteristic of the transfer ratio control mechanism.

As shown in FIG. 3, the target angle calculating section 70a calculates a target angle achieved by the motor 31 according to the vehicle speed and a map. For example, a suitable transfer ratio for a vehicle speed is read from the map. Then, the target angle is calculated from the steering speed and the product of the transfer ratio and the steering angle. The feedback control section 70b provides a feedback control signal of an angle feedback duty ratio to make the difference between the target angle obtained by the target angle calculating section 70a and the ACT angle zero. The torque duty calculation section 70c calculates a torque duty ratio of the signal that prevents idling of the motor 31 until the transfer ratio control mechanism 30 starts operation.

The torque duty calculation section 70c detects the steering torque that is applied to the steering wheel 10 at the steering speed being zero to calculate a torque duty ratio that provides a torque to control the idling of the motor 31. However, the torque duty calculation section 70c may detect the steering torque when the steering angle becomes a preset angle or until the target angle of the motor 31 is provided.

The torque duty calculation section 70c continues to control the motor 31 to generate the control torque after the transfer ratio control mechanism 30 has started its operation.

Figure 6:
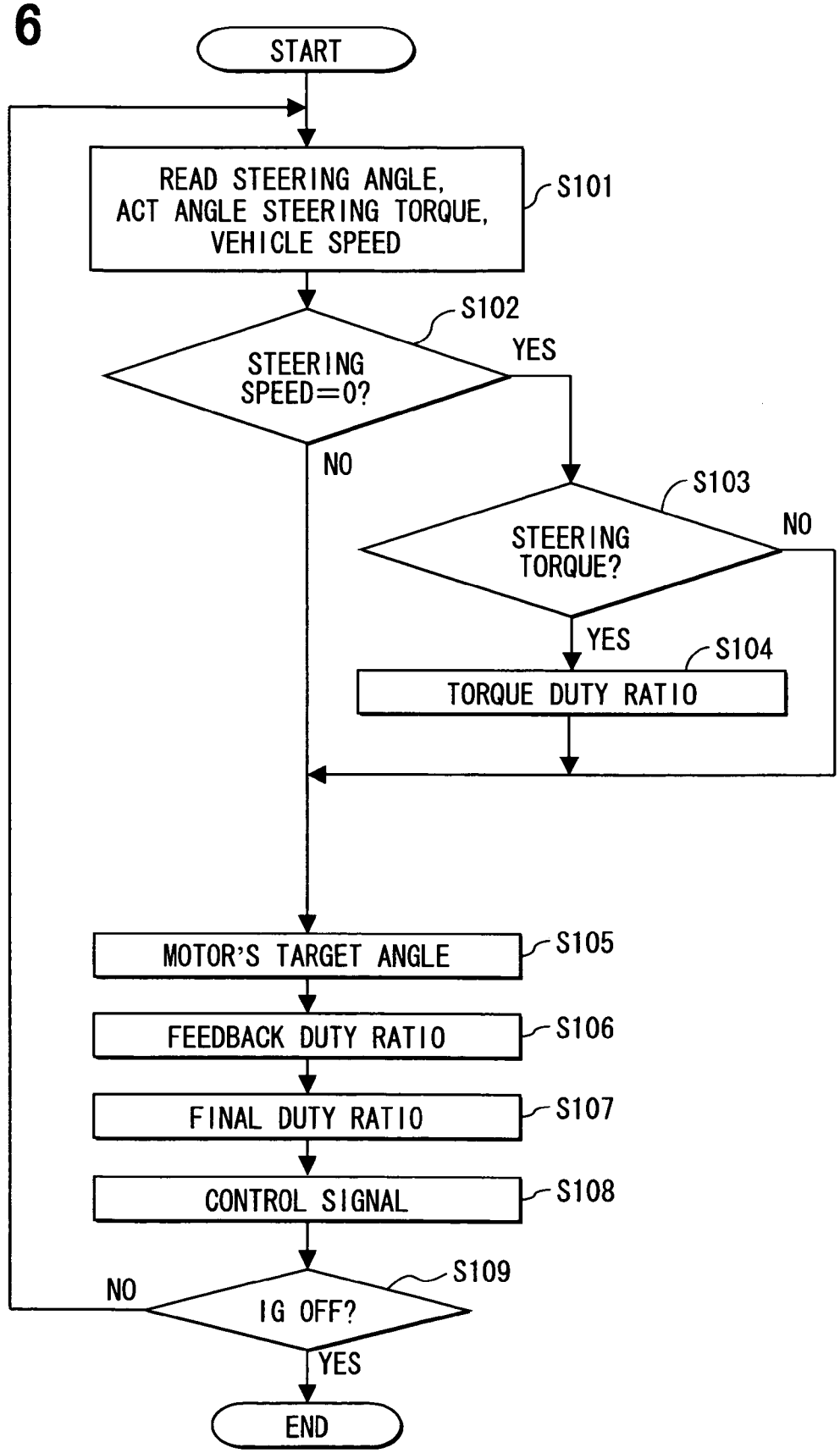
FIG. 6 is a flow diagram of a control operation of the transfer ratio control mechanism.

The operation of the transfer ratio control mechanism 30 will be described with reference to a flow diagram shown in FIG. 6.

When an ignition switch of a vehicle is turned on, the steering angle that is detected by the steering angle sensor 21, the ACT angle that is detected by the ACT angle sensor 41, the steering torque that is detected by the steering torque sensor 42 and the vehicle speed that is detected by the vehicle speed sensor 71 are read at step S101. Then, whether the steering speed is zero or not is examined at S102. If the result of the examination is Yes, step S103 follows. Otherwise, step S105 follows.

At S103, whether the steering torque appears or not is examined. If the result of the examination is Yes, step S104 follows to calculate the torque duty ratio.

Otherwise, step S105 follows to calculate the target angle of the motor 31. Then, the feedback duty ratio is calculated at S106. Subsequently, the motor control signal of the final duty ratio is calculated at S107, and outputted to the motor 31 at S108. Thereafter, whether the ignition switch is turned off or not is examined at S109. If the result of the step S109 is No, the operation returns to S101 to repeat the above steps again until the result of the step S109 becomes Yes.

Thus, the torque duty calculation section 70c calculates a signal of the torque duty ratio to cancel the steering torque until the transfer ratio control mechanism 30 starts operation. Then, the motor control signal of a final duty ratio is formed from the feedback duty ratio and the torque duty ratio to drive the motor 31, as shown in FIG. 3, so that the motor can be prevented from idling due to the steering torque that is applied before the transfer ratio control mechanism 30 starts operation. As a result, the response of the transfer ratio control mechanism 30 is improved as shown by a solid line in FIG. 5B.

When the direction of the steering torque changes from one direction to the other, the direction of the control torque may be changed.

When both the steering torque and the steering speed become zero, the torque duty ratio may be formed to gradually become zero, which is applied to the motor 31.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle steering system for steering vehicle wheels, said system comprising:
   a steering wheel;
   a steering power assisting unit for providing assisting power when said steering wheel is steered;
   a transfer ratio control mechanism, including a transfer ratio changing mechanism and a driving motor for driving said transfer ratio changing mechanism, for controlling a ratio of a steering angle of said steering wheel to a steered angle of said vehicle wheels;
   a steering torque sensor that detects steering torque applied to said steering wheel; and
   a motor control circuit for driving said driving motor based on at least the detected steering torque to achieve a suitable ratio of a steering angle of said steering wheel to a steered angle of said vehicle wheels, wherein said motor control circuit comprises means for controlling said driving motor to generate a torque so as to cancel the steering torque applied to said steering wheel when said steering torque sensor detects steering torque applied to said steering wheel before said driving motor is driven by said motor control circuit.

2. A vehicle steering system as in claim 1, wherein said torque sensor detects steering torque applied to said steering wheel when said steering wheel is turned from a prescribed angular position.

3. A vehicle steering system as in claim 1, wherein said torque sensor detects steering torque applied to said steering wheel when said steering wheel is at a steering speed of zero.

4. A vehicle steering system as in claim 1, wherein:
   said motor control circuit calculates a target angle for said driving motor to turn; and
   said steering torque sensor detects the torque applied to said steering wheel before the target angle is given to said driving motor.

5. A vehicle steering system as in claim 1, wherein said motor control circuit continuously provides a torque to cancel the steering torque after said transfer ratio control mechanism has started.

6. A vehicle steering system as in claim 5, wherein the direction of the torque to cancel steering torque is changed when the direction of the steering torque changes.

7. A vehicle steering system for steering a steering wheel of a vehicle to thereby steer a vehicle wheel, said system comprising:
   a steering power assisting means for providing assisting steering power when said steering wheel is steered;

a transfer ratio changing mechanism for changing a ratio of a steering angle of said steering wheel to a steered angle of said vehicle wheel according to a vehicle condition;

a steering torque sensor for detecting a steering torque applied to said steering wheel;

a control circuit for controlling said transfer ratio changing mechanism based on at lest the steering torque detected by said steering torque sensor to achieve a suitable transfer ratio of a steering angle of said steering wheel to a steered angle of said vehicle wheels, wherein:

said transfer ratio changing mechanism includes a gear mechanism connected between said steering wheel and said vehicle wheel and a driving motor associated with said gear mechanism to change the transfer ratio; and said control circuit comprises means for driving said driving motor to generate a torque to cancel the steering torque applied to said steering wheel when the steering torque is detected before said transfer ratio control mechanism is controlled by said control circuit.

8. A vehicle steering system as in claim 7, wherein said transfer ratio changing mechanism comprises a gear mechanism connected between said steering wheel and said vehicle wheel so as to change the ratio of a steering angle of said steering wheel to a steered angle of said vehicle wheel.

9. A vehicle steering system as in claim 8, wherein:

said transfer ratio changing mechanism further comprises a motor for driving said gear mechanism to change the ratio according to the vehicle condition; and said control circuit controls said motor to cancel detected steering torque when detected until said transfer ratio control mechanism starts operation.

10. A vehicle steering system for steering a steering wheel of a vehicle to thereby steer a vehicle wheel, said system comprising:

a steering power assisting means for providing assisting steering power when said steering wheel is steered;

a transfer ratio control mechanism, including an input shaft connected to said steering wheel and an output shaft connected to said vehicle wheel, for changing a ratio of a turning angle of said input shaft to a turning angle of said output shaft according to a vehicle condition;

a steering torque sensor for detecting a steering torque applied to said steering wheel;

a control circuit for controlling said transfer ratio changing mechanism so as to cancel detected steering torque when detected before said transfer ratio control mechanism starts operation.

11. A method for controlling power-assisted steering of vehicle wheels using a motor-controlled transfer ratio control mechanism between a steering wheel and the steered vehicle wheels, said method comprising:

detecting steering torque applied to a vehicle steering wheel; and generating and applying a balancing torque to counteract said detected steering torque at a steering speed of zero before steering movement has yet occurred.

\* \* \* \* \*